United States Patent [19]
Ault et al.

[11] Patent Number: 6,154,751
[45] Date of Patent: Nov. 28, 2000

[54] METHOD FOR EXECUTING A USER-REQUESTED CGI PROGRAM IN A NEW AUTHENTICATION CONTEXT WHILE PROTECTING OPERATION OF A DEFAULT WEB SERVER PROGRAM

[75] Inventors: Michael Bradford Ault; Garry L. Child, both of Austin; Ernst Robert Plassmann, Pflugerville; Bruce Arland Rich, Round Rock; Theodore Jack London Shrader; Davis Kent Soper, both of Cedar Park, all of Tex.

[73] Assignee: International Business Machines Corporation, Armonk, N.Y.

[21] Appl. No.: 09/078,930

[22] Filed: May 14, 1998

[51] Int. Cl.⁷ .................................................. G06F 17/30
[52] U.S. Cl. ............................. 707/201; 707/9; 707/10; 705/30; 395/200
[58] Field of Search ................... 707/201, 9, 10, 707/15, 1; 705/30; 713/201; 395/200

[56] References Cited

U.S. PATENT DOCUMENTS

| | | | |
|---|---|---|---|
| 5,187,790 | 2/1993 | East et al. | 395/725 |
| 5,421,011 | 5/1995 | Camillone et al. | 395/650 |
| 5,463,625 | 10/1995 | Yasrebi | 370/85.13 |
| 5,596,579 | 1/1997 | Yasrebi | 395/678 |
| 5,623,601 | 4/1997 | Vu | 395/187.01 |
| 5,682,478 | 10/1997 | Watson et al. | 395/200.12 |
| 5,684,951 | 11/1997 | Goldman et al. | 395/188.01 |
| 5,692,180 | 11/1997 | Lee | 395/610 |
| 5,708,780 | 1/1998 | Levergood et al. | 395/200.12 |
| 5,721,827 | 2/1998 | Logan et al. | 395/200.47 |
| 5,802,518 | 9/1998 | Karaev et al | 707/9 |
| 5,819,271 | 10/1998 | Mahoney et al. | 707/9 |
| 5,857,191 | 1/1999 | Blackwell, Jr. et al. | 707/10 |
| 5,903,732 | 11/1999 | Reed et al. | 395/200 |
| 5,908,469 | 6/1999 | Botz et al. | 713/201 |
| 5,918,228 | 6/1999 | Rich et al. | 707/10 |
| 5,930,772 | 7/1999 | Gomyo et al | 705/30 |
| 5,974,566 | 10/1999 | Ault et al. | 714/15 |

FOREIGN PATENT DOCUMENTS

| | | |
|---|---|---|
| 9714098 | 4/1997 | WIPO . |
| 9740617 | 10/1997 | WIPO . |

OTHER PUBLICATIONS

Schultz, IBM Technical Disclosure Bulletin, "Personal Net Machine," Mar. 1997, vol. 40, No. 3, pp. 215–216.
Rodriguez, IBM Technical Disclosure Bulletin, "Passport File for Secure Access to the Internet," Feb. 1996, vol. 39, No. 2, pp. 333–334.
Burger, IBM Technical Disclosure Bulletin, "Session–Based Secure Communication for Secure Xenix," Feb. 1990, No. 9a, p. 239–243.
Lenharth et al., IBM Technical Disclosure Bulletin, "Wrap Server (SMB) Authentication from a Windows NT Client," Oct. 1997, vol. 40, No. 10, pp. 99–100 and 185–186.

*Primary Examiner*—Thomas G. Black
*Assistant Examiner*—Thuy Do
*Attorney, Agent, or Firm*—Jeffrey S. LaBaw; David H. Judson

[57] ABSTRACT

A method of executing Common Gateway Interface (CGI) programs in a computer network having a Web client and a Web server, the server connectable to a secure distributed file system of a distributed computing environment. If a Web client user request requires CGI processing, the requested CGI program is run in a new process spawned from the Web server thread and executing within the context of the temporary user identity set up with the proper DCE credentials. This function is effected by saving the name and path of the user-requested CGI program and then substituting the name and path of an encapsulation CGI program. The encapsulation CGI program starts the user-requested CGI program in a new process (i.e. a desktop) within the context of the temporary user identity (having proper DCE credentials). The encapsulation program thus ensures that the CGI program being executed cannot harm the default Web server desktop.

25 Claims, 5 Drawing Sheets

METHOD FOR EXECUTING A USER-REQUESTED CGI PROGRAM IN A NEW AUTHENTICATION CONTEXT WHILE PROTECTING OPERATION OF A DEFAULT WEB SERVER PROGRAM

BACKGROUND OF THE INVENTION

1. Technical Field

The present invention relates generally to Web Common Gateway Interface (CGI) transaction processing and more particularly to enabling CGI-based access to protected files (e.g., Web documents) stored in a secure distributed file system.

2. Description of the Related Art

The World Wide Web of the Internet is the most successful distributed application in the history of computing. In the Web environment, client machines effect transactions to Web servers using the Hypertext Transfer Protocol (HTTP), which is a known application protocol providing users access to files (e.g., text, graphics, images, sound, video, etc.) via a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection.

Use of an HTML-compatible browser (e.g., Netscape Navigator or Microsoft Explorer) at a client machine involves specification of a link via the URL. In response, the client makes a request to the server identified in the link and receives in return a document formatted, for example, according to HTML.

Common Gateway Interface (CGI) programs are an important part of the HTTP server function. CGI is a World Wide Web standard for extending HTML functionality. CGI processing typically involves the combination of a live Web server and external programming scripts or executables. In particular, CGI programs are typically used to return dynamic information and to respond to HTTP browser input in HTML forms.

Many business organizations and other entities now desire to integrate Web transaction processing into their distributed computing environment in which users access distributed resources and process applications. A known distributed computing environment, called DCE, has been implemented using "open" software conforming to standards implemented from time-to-time by the Open Group (f/k/a the Open Systems Foundation (OSF)). As DCE environments become more popular, many applications have been written and utilized to provide distributed services such as data sharing, printing services and database access. Open Group DCE includes a distributed file system, called Distributed File Services (DFS), for use in these environments.

DFS provides many advantages over a standalone file server, such as higher availability of data and resources, the ability to share information throughout a very large-scale system, and protection of information by the robust DCE security mechanism. In particular, DFS makes files highly available through replication, making it possible to access a copy of a file if one of the machines where the file is located goes down. DFS also brings together all of the files stored in various file systems in a global namespace. Multiple servers can export their file system to this namespace. All DFS users, in the meantime, share this namespace, making all DFS files readily available from any DFS client machine.

It would be highly desirable to extend the functionality of existing standalone Web servers in the enterprise environment to take advantage of the scalability, file availability and security features of DFS (or other similar distributed file systems). As a by-product, users with an off-the-shelf browser would be able to easily access the Web information stored in the DFS namespace with no additional software on the client machine. CGI functionality would also be supported.

This goal, however, cannot be readily achieved, especially with respect to client-server based systems running a "closed" native operating system such as Microsoft Windows NT. Because of the "closed" nature of Windows NT, a user of a client machine running this operating system may only log on against an account held at the machine, at a server running the Windows NT operating system, or at any other servers that are "trusted" by the NT server that the client is configured against. Only these options are supplied to the user during the logon process, and there are no practical interfaces to allow user authentication from non-native server domains. This closed architecture eliminates the ability of the Web server to impersonate a user of Windows NT client machine and thereby access a protected DFS file, and CGI functionality is not supported.

A method of obtaining a DCE credential and making that credential available to a Netscape server process prior to accessing a file within a DFS filespace has been described in U.S. Pat. No. 5,918,228 to Rich et al. That patent is entitled "Method And Apparatus For Enabling A Web Server To Impersonate A User Of A Distributed File System To Obtain Secure Access To Supported Web Documents" and is assigned to the assignee of this application. The method described in this patent, however, does not work when the server process is supported on a Windows NT platform, and the above-described application does not provide CGI function support.

This invention addresses this need.

BRIEF SUMMARY OF THE INVENTION

A specific object of this invention is to enable Common Gateway Interface (CGI) programs to access DCE-protected resources from a native operating system environment such as Windows NT.

Another specific object of this invention is to provide a "Windows NT" method for enabling a Web server to impersonate a user of a Web client machine and thereby obtain CGI program access to a file protected within a secure distributed file system.

A more particular object of this invention is to replace normal CGI processing done by a Web server by running a requested CGI program in a new process executing within the context of a temporary user identity set up with proper security credentials.

Another specific objective of this invention is to provide a method and mechanism whereby CGI programs acquire DCE credentials and use them to access DCE-protected resources from a closed native operating system environment, e.g., a Windows NT platform.

More generally, another objective of this invention is to provide a computer program-implemented method, machine and medium for controlling execution of a CGI program without comprising the operation of a default Web server.

Generalizing still further, another important object of this invention is to provide a method for protecting concurrently executing computer processes running in a computer network from problems that might impair the operation of one of the processes. In this manner, any problems with a given one of the processes is isolated from the other concurrently executing process. A preferred implementation involves a parent process, such as a Web server thread, and a child process, such as a CGI program spawned from the Web server thread.

Still another general object of this invention is to provide a mechanism for isolating a child process spawned from a parent process to protect the parent process in the event the child process must be brought down or otherwise encounters an operating problem.

In the preferred embodiment, the parent process is a Web server thread and the child process is a CGI program. A preferred mechanism to isolate the parent and child processes comprises a so-called "encapsulation" process or program. The encapsulation process provides a means by which a user-requested CGI program is executed within a separate "desktop" to protect the Web server program.

Yet another general object of this invention is to authenticate a user of a closed native operating system (e.g., Windows NT) that attempts CGI-based access to a secure distributed file system through an Internet World Wide Web server.

Another general object of this invention is to provide an authentication scheme to facilitate secure Web document access from a distributed file system.

It is yet another object of the invention to implement a Windows NT operating system-based authentication scheme for Web server applications to enable the Web server to impersonate a Web client browser user to a secure file system.

Still another object of this invention is to enable a user of an off-the-shelf browser to access Web information stored in the DFS namespace using CGI programs, typically with no additional software on the client machine.

The invention preferably is implemented in a plug-in or other application executed by the Web server. The plug-in component has associated therewith a session manager control process and a session manager process, each of which preferably are created by the server plug-in component when the Web server initializes. During its initialization, the session manager control process calls Windows NT APIs to create a pool of temporary NT user identities (and their NT logon passwords) for use by the session manager process. When a browser user attempts to access a DFS file from a Windows NT system running the Web server and the server plug-in, the plug-in component prompts the browser user for a DCE user id and password. When the plug-in component receives this input, it invokes the session manager process in an attempt to acquire the credentials of that DCE user. In particular, the session manager process obtains an unused NT user identity from the pool and marks it as "in use". It then invokes DCE security API's necessary to perform a "program" DCE login. These API's create a DCE credential file for the DCE user and return the path specification of the file.

If the user request requires CGI processing, the requested CGI program is then run in a new process spawned from the Web server thread and executing within the context of the temporary NT user identity set up with the proper DCE credentials. This function is effected by saving the name and path of the user-requested CGI program and then substitutes the name and path of an encapsulation CGI program. Generally, the encapsulation CGI program starts the user-requested CGI program in a new process (i.e. a desktop) within the context of the temporary NT user identity (having proper DCE credentials). The encapsulation program thus ensures that the CGI program being executed cannot harm the default Web server desktop.

In operation, the encapsulation CGI program starts the desktop process. It obtains the name and path of the user-requested CGI, and then executes that CGI program by calling appropriate local (e.g., Windows NT API) resources.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
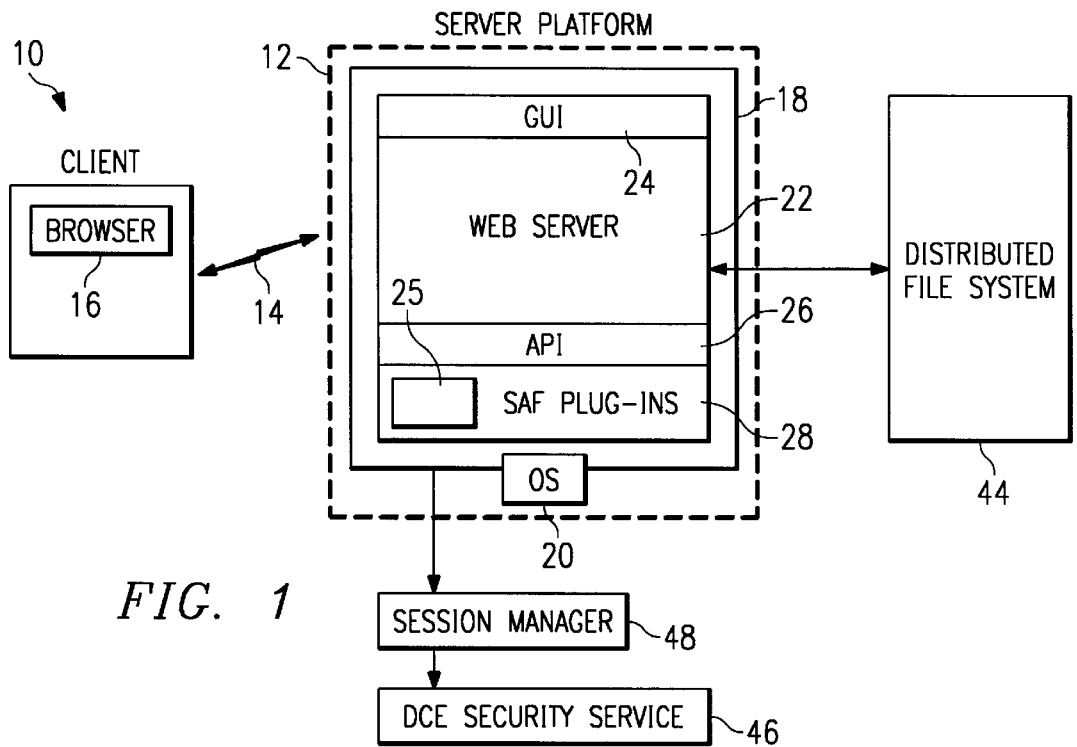
FIG. 1 is a representative system in which the plug-in of the present invention is implemented.

A representative system in which the present invention is implemented is illustrated in FIG. 1. A client machine 10 is connected to a Web server platform 12 via a communication channel 14. For illustrative purposes, channel 14 is the Internet, an intranet or other known connection. In the case of the Internet, Web server platform 12 is one of a plurality of servers that are accessible by clients, one of which is illustrated by machine 10. A client machine includes a browser 16, which is a known software tool used to access the servers of the network. By way of example only, a client machine is a personal computer. Representative browsers include, among others, Netscape Navigator (all versions), Microsoft Internet Explorer (all versions) or the like, each of which are "off-the-shelf" or downloadable software programs. The Web server platform supports files in the form of hypertext documents and objects. A set of related documents is sometimes referred to as a "Web" site. In the Internet paradigm, a network path to a server is identified by a so-called Uniform Resource Locator (URL). The World Wide Web is the Internet's multimedia information retrieval system. In particular, it is a collection of servers of the Internet that use the Hypertext Transfer Protocol (HTTP), which provides users access to files using Hypertext Markup Language (HTML).

A representative Web Server platform 12 comprises an Intel processor-based computer 18 running Microsoft Windows NT operating system Version 4.0 20 and a Web server program 22, such as Netscape Enterprise Version 2.x (or higher), that supports interface extensions. The platform 12 also includes a graphical user interface (GUI) 24 for management and administration. While the above platform is useful, any other suitable hardware/operating system/web server combinations may be used.

Figure 2:
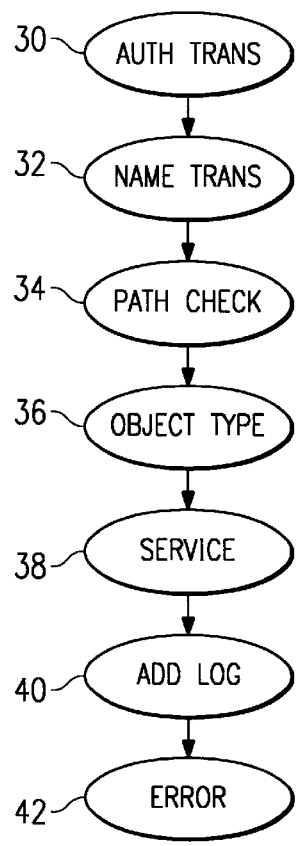
FIG. 2 is a flowchart of server side operations of a conventional Web transaction in response to receipt of a request from a browser of a client machine.

The Web server accepts a client request and returns a response. The operation of the server 18 is governed by a number of server application functions (SAFs), each of which is configured to execute in a certain step of a sequence. This sequence, illustrated in FIG. 2, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client via a normal server-service routine. The particular function selected depends on the nature of the request. The present invention, as will be seen, concerns the situation where the server function runs a Common Gateway Program (CGI) program resident on the Web server. At step 40, called Add Log (AddLog), information about the transaction is recorded. At step 42, called Error, the server responds to the client when it encounters an error.

Thus, the Web server 18 includes a known set of server application functions (SAFs). These functions take the client's request and other configuration data of the server as input and return a response to the server as output. Referring back to FIG. 1, the Web server 18 also includes an Application Programming Interface (API) 26 that provides extensions to enable application developers to extend and/or customize the core functionality thereof (namely, the SAFs) through software programs commonly referred to as "plug-ins." The present invention makes use of the server API 26 to provide for a plug-in that facilitates user authentication so that users of client machines may use browsers to enable Web access to documents on a distributed file system 44. While the invention is preferably implemented in the form of a server "plug-in", this is not a limitation as the functionality (or portions thereof) may be provided in the form of a standalone application or other program code, device or system.

According to a general object of the present invention, it is desired to enable the user of the client machine 10 to use the browser 16 to access, browse and retrieve documents located in the distributed file system 44. One such file system 44 is Distributed File Services (DFS), which is a known distributed file system implemented in a networked environment called the Distributed Computing Environment (DCE). DCE has been implemented using software available from the Open Group (f/k/a Open Systems Foundation (OSF)). In a distributed computing environment, a group of machines is typically referred to as a "domain." An Open Group DCE domain is called a "cell." A DCE cell may be a complex environment involving hundreds of machines in many locations.

DCE DFS 44 provides data sharing services by making use of remote procedure calls (RPC's) for naming, and a DCE Security Service 46 for authentication services. DFS 44 interfaces to the DCE Security Service 46 via the session manager process 48. In addition to its use of DCE Services, DFS itself is rich in features. It provides a uniform global filespace which allows all DFS client users to see the same view of the filespace, and it caches filesystem data at the client for improved scalability and performance by reducing network traffic to file servers. DFS also supports advisory file locking, and one of its features is the ability to export the operating system's native filesystem.

Figure 3:
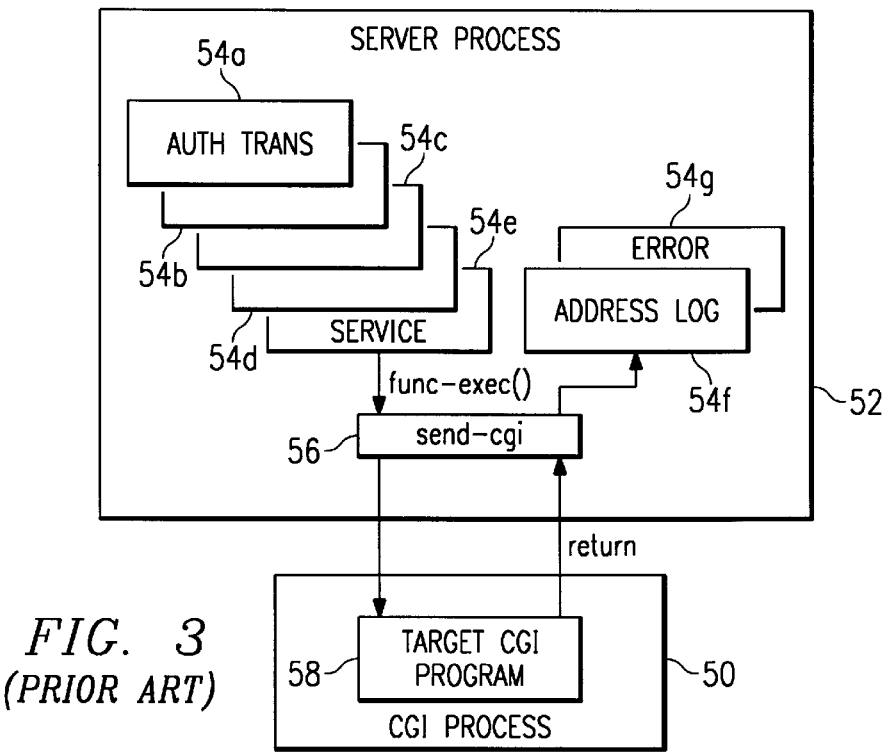
FIG. 3 is a process flow diagram illustrating how a server process launches a CGI child process according to a known technique.

As previously noted, Common Gateway Interface (CGI) programs are an important part of the HTTP server function. CGI programs are typically used to return dynamic information and to respond to HTTP browser input in HTML forms. CGI programs usually run as child processes created under HTTP server processes. This known "prior art" model is now described in conjunction with the process flow diagram shown in FIG. 3. As illustrated there, the CGI process 58 is run as a "child" process to the HTTP server or "parent" process 52. In particular, during the Web transaction, the server process 52 executes the AuthTrans, NameTrans, PathCheck and ObjType methods 54*a*–54*d* described above with respect to steps 30, 32, 34 and 36 in FIG. 2. At this point in the transaction, the CGI process has not actually been created, although it is shown in the illustration. After executing steps 30, 32, 34 and 36, the service request is handled (which is step 38 in FIG. 2) using the Service method 54*e*. It is now assumed that the Web transaction involves a CGI script or program. In such case, the HTTP server Process 52 performs a func__exec( ) call to a CGI service method 56, called send-cgi. The send-cgi service method then creates a new process (e.g., by executing a create process method). In particular, this creates and then starts a new process, which is the target CGI program 58. As a result, the target CGI program 58 is executed, and the results returned to the send-cgi service method. Thereafter, the HTTP server process returns control to the Addlog service method 54*f*. The Error service method 54*g* is then run to complete the server portion of the transaction.

Figure 4:
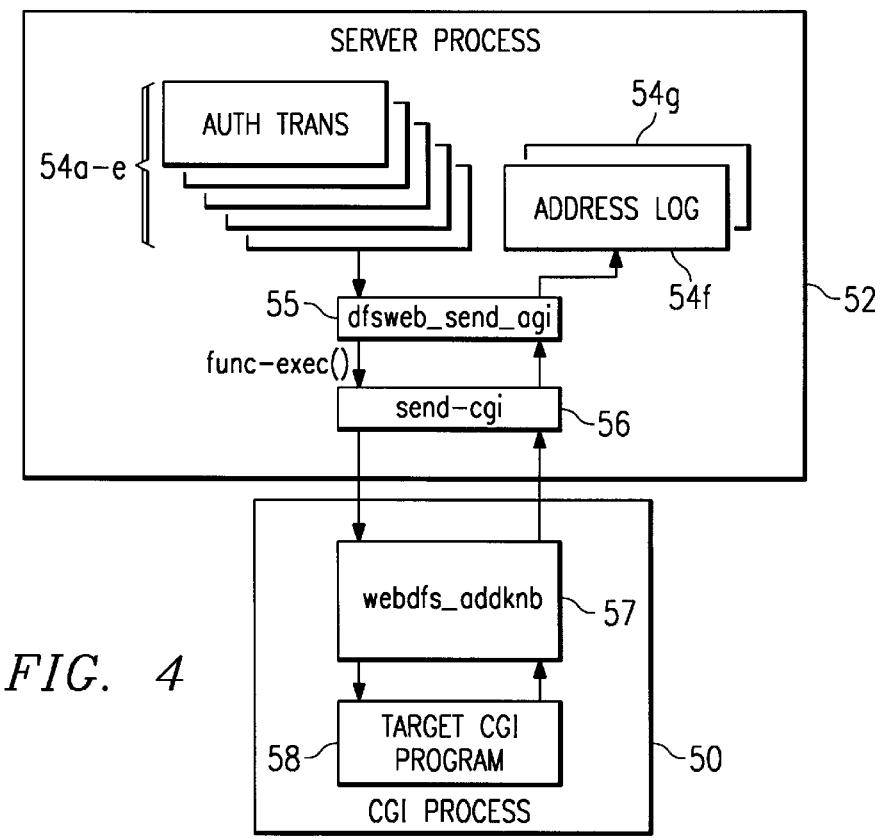
FIG. 4 is a modification of the process flow diagram of FIG. 3 illustrating the encapsulation mechanism of the present invention.

The above-described CGI processing is conventional. According to the invention, the conventional send-cgi service method 56 is "encapsulated" between code that has been added in the HTTP server process 52 and code that has been added in the CGI child process 50. This is illustrated in the block diagram of FIG. 4. As used herein, the code added to the HTTP server process is a program 55 (e.g., a plug-in referred to herein as "dfsweb__send__cgi") and the CGI encapsulation code is a program or process 57 (sometimes referred to as "webdfs__addkrb.exe"). As will be seen, together these routines provide a mechanism for enabling execution of a user-requested CGI program 58 within a separate Windows NT "desktop" to protect the "default" Web server program against errors that might otherwise harm the default server program. The encapsulation program also executes the user-requested CGI program 58 on behalf of a temporary NT user identity set up by the session manager process.

Figure 5:
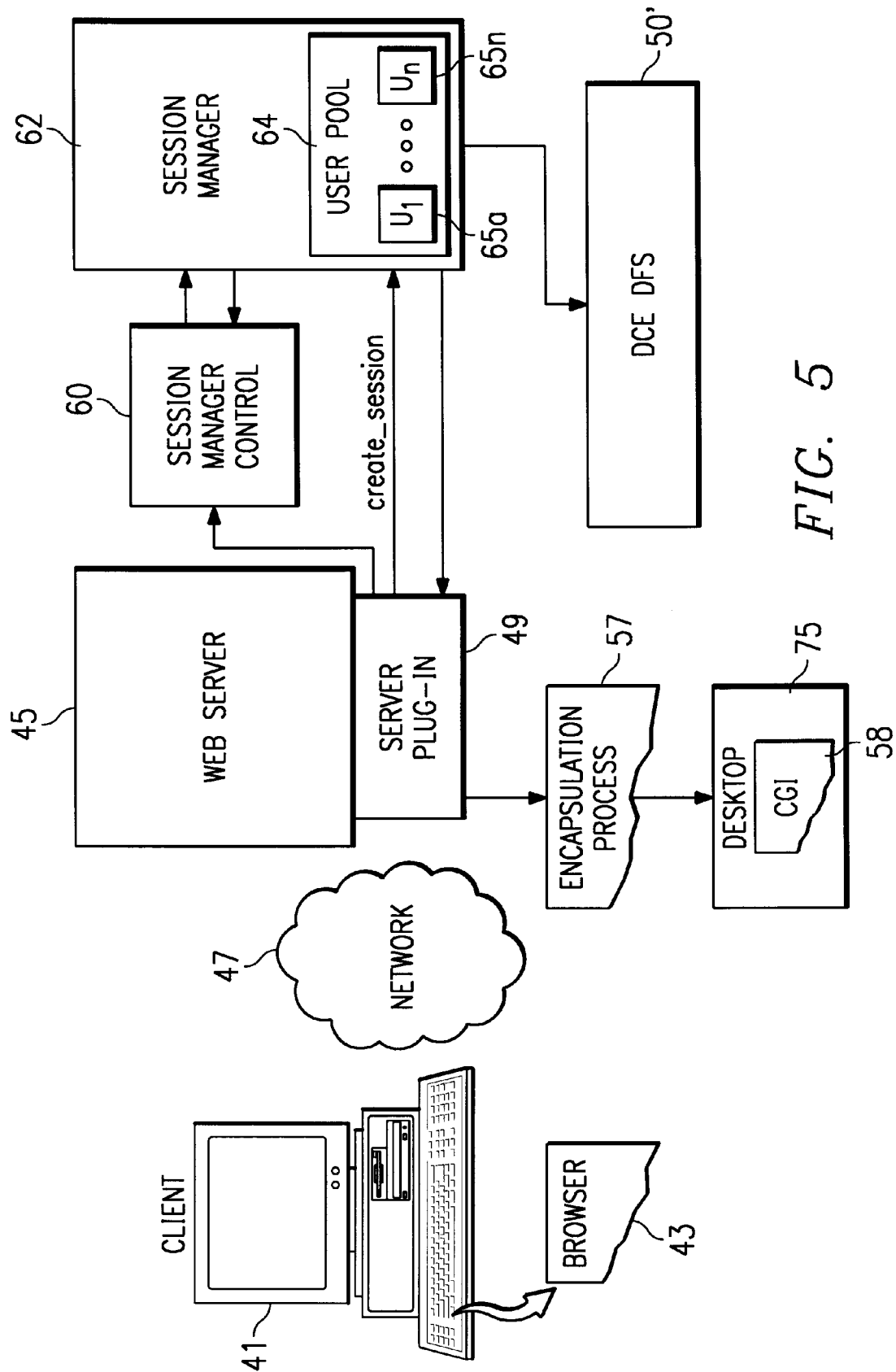
FIG. 5 is a detailed block diagram illustrating a Web server with a plug-in and its associated processes that comprise a preferred embodiment of the present invention.

A preferred embodiment of the present invention is now described and illustrated in FIG. 5. In this illustrative system, client 41 having a Web browser program 43 connects to a server platform 45 over a network 47 such as the Internet, an intranet or the like. Client and server, in this example, run the Microsoft Windows NT operating system or some other such closed system. Server platform 45 supports a Web server program such as the Netscape Enterprise Server Version 2.x or higher. A Web server component 49 (which is preferably a plug-in, but may be a standalone application, servlet or the like) is associated with and run by the Web server 45 for performing various security and other functions to facilitate secure access to secure or protected resources. Such resources, for purposes of illustration, reside in the distributed computing environment (DCE) cell, which is represented by block 50' in the figure. DCE cell 50' thus represents any number of machines in the network configured together as a managed cell. As noted above, DCE 50' may also include, for example, a distributed file service such as Open Group Distributed File Services (DFS). Other secure file services may be provided as well. As noted above, DFS provides for secure access to Web-based documents and other files.

The system also includes a session manager control process 60 and a session manager process 62, each of which preferably are created by the server plug-in component 49 when the Web server 45 initializes. During its initialization, the session manager control process 60 calls Windows NT APIs to create a pool 64 of temporary NT user identities 65a . . . n (and their NT logon passwords) for use by the session manager process 62. This NT user pool may be a simple table that is maintained within a memory-mapped file shared between the two processes. Any other convenient data structures may be used to represent the temporary NT user pool.

In the Windows NT environment, each process (whether or not accessible by a user through the display interfaces) is referred to as a "desktop". Generally, a "desktop" is the set of processes, windows, menus, etc. associated with a user's logged-on session. The desktop has a "logical" display surface, and usually only one desktop at a time is "interactive", meaning it can be seen and receive input from the mouse, keyboard, and the like. Every program/process running in the system is associated with a desktop, usually it defaults to the desktop of the "parent" program/process. Even background services are associated with a desktop, but they are not usually visible because they are not typically associated with the "interactive" desktop.

The Web server 45 thus has a default "desktop". As seen in FIG. 5, according to the invention, the "encapsulation" process 57 (called webdrs_addkrb.exe) is started by the Web server 45 as needed to execute the user-requested CGI program 58 within a separate Windows NT desktop 75. The particular details and operation of any given user-requested CGI program 45 is not part of the present invention. However, by controlling execution of such CGI program (in the manner to be described below), the present invention provides a significant advantage of protecting the Web server thread from corruption should an error occur during the processing of the requested CGI functionality. Thus, for example, if the encapsulation process were not used to isolate and thus protect the CGI program from the Web server's default desktop, that program could corrupt the server's desktop by walking over memory, destroying server processes required or existing in that desktop, or the like. As will be described, once the new desktop is created, the encapsulation process enables the requested CGI program to execute within the context of the temporary NT user identity previously set up with the proper DCE credentials.

By way of brief background, because of the "closed" nature of the Windows NT operating system, a user of the client machine 41 may only log on against an account held at the machine, at a server (such as server 45) running the Windows NT operating system, or at any other servers that are "trusted" by the NT server that the client is configured against. Only these options are supplied to the user during the logon process, and user authentication from non-native server domains is impractical. Moreover, in known Windows NT systems, a local NT user account is required for logon and subsequent user actions. Thus, the NT user account required for initial authentication may exist only on an NT client or in an NT server domain. This closed architecture eliminates the ability to access protected resources within the DCE cell 50'.

Figure 6:
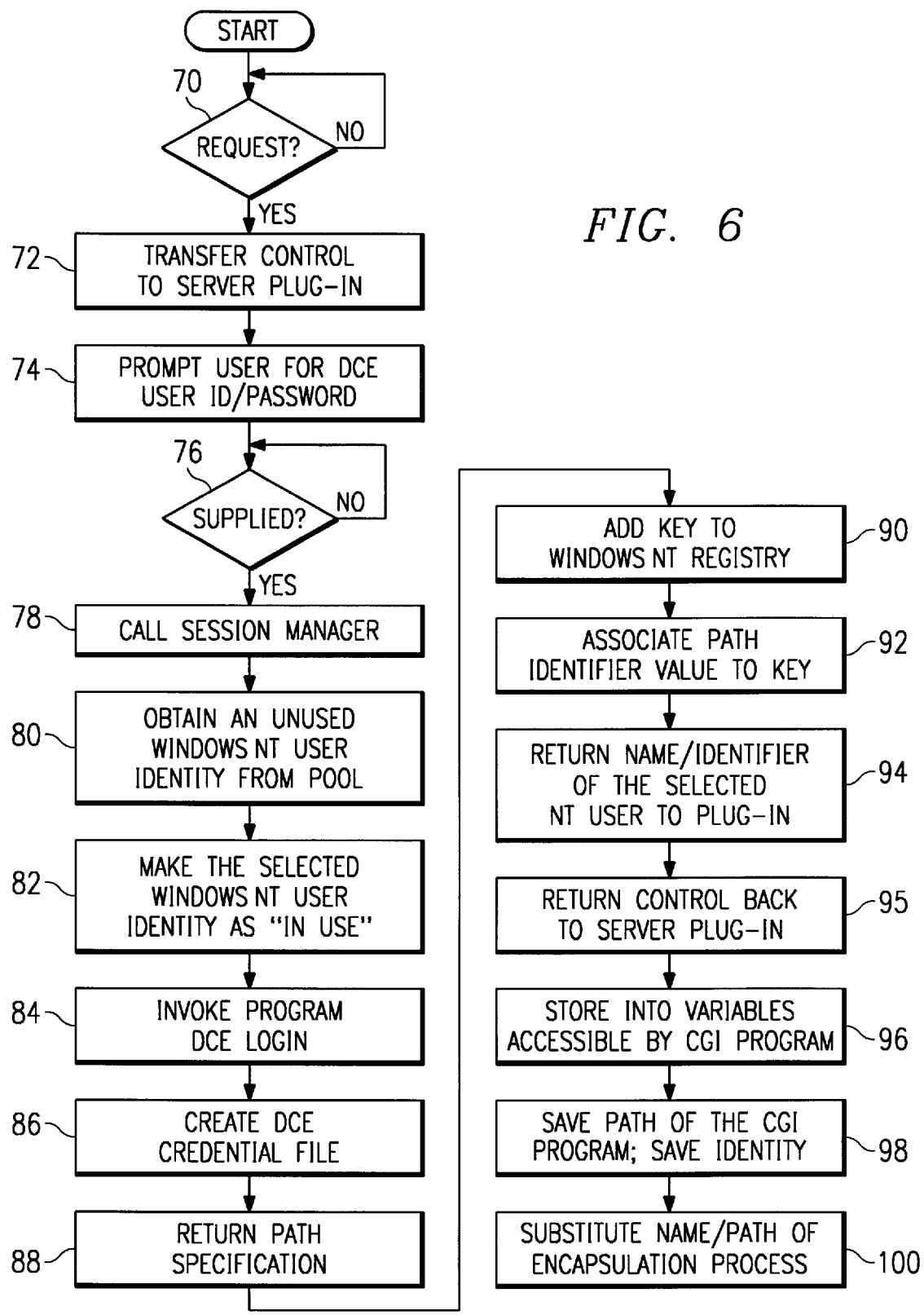
FIG. 6 is a flowchart illustrating the server plug-in operations during a Web transaction for use in associating a DCE credential to a temporary Windows NT user identity.

To facilitate the present invention, it is thus first required to set up a temporary Windows NT user identity with proper DCE credentials. A preferred operation is illustrated in the flowchart of FIG. 6. For purposes of the following discussion, it is assumed that the server plug-in component 49 was started (e.g., when the Web server 45 initializes) and that, during its initialization, the session manager control process 60 has called the appropriate Windows NT APIs to create the pool 64 of temporary Windows NT user identities (and their NT logon passwords) for use by the session manager process 62 as has been described. It is also assumed that the Web server has a plurality of threads for servicing requests received from client machines. An instance of the plug-in component 49 executes under each such server thread.

The routine begins at step 70 (in FIG. 6) by testing whether a browser-initiated request to a CGI program has been received. If not, the routine cycles. If, however, the outcome of the test at step 70 is positive, the routine continues at step 72. At this point, the server plug-in component 49 receives control on a server thread that has been dispatched to service the browser-initiated request for the resource. At step 74, the routine prompts the browser user for his or her DCE userid and password. This is preferably done using a basic authentication protocol. At step 76, a test is made to determine whether the DCE userid and password have been supplied. If not, the routine cycles. If, however, the outcome of the test at step 76 indicates that the DCE userid and password have been supplied by the browser user, the routine continues at step 78.

At this point, the server plug-in component 49 calls the session manager 62, e.g., through a create_session( ) remote procedure call (RPC). The following processing then takes place. At step 80, the routine obtains an unused Windows NT user identity from the temporary Windows NT user pool 64 which has previously created during initialization. At step 82, the routine marks the selected unused Windows NT user identity as "in use" so that the identity cannot be used by another server thread. At step 84, the routine uses the DCE userid and password entered (by the user) at step 74 to invoke DCE security APIs to perform an automatic or so-called "programmatic" login. This is a known dce_login function. At step 86, these APIs create a DCE "credential file" for the DCE user. At step 88, a path specification of the DCE credential file is returned to the session manager process 62.

The routine then continues at step 90 with the session manager process 62 adding a "key" to the Windows NT registry (or other suitable storage location) of the Windows NT operating system on the server platform. The key is the "name" or other "identifier" (e.g., SID, which is a Windows NT Security Identifier that uniquely identifies the NT user) of the selected temporary Windows NT user. At step 92, the routine associates a "value" (e.g., a string) representing the path specification to the DCE credential file returned to the session manager 62 at step 88. Thus, these steps make the DCE credential accessible to the DCE cell (and, DFS, in particular) and thus, generally, associates the credential with the selected temporary user identity. The Windows NT registry thus contains an entry (comprising a name/identifier and value pair) that associates the selected NT user with a DCE credentials file. At step 94, the routine returns to the server plug-in 49 the name/identifier of the selected temporary NT user, together with the NT user's password. At step 95, control is then returned back to the server plug-in component 49. At step 96, the user identity and password are stored into variables accessible by a CGI program.

Figure 7:
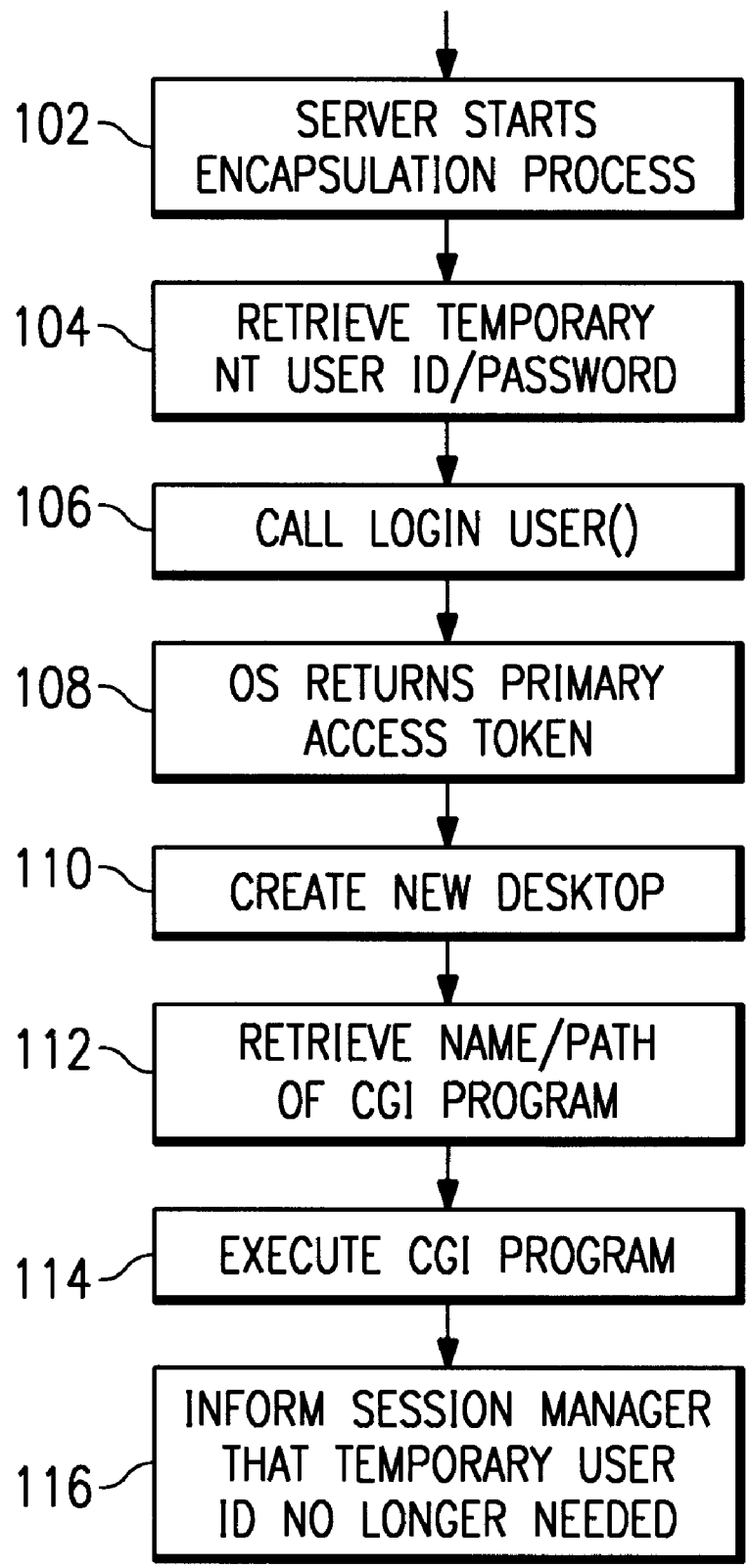
FIG. 7 is a flowchart showing a preferred method of isolating the CGI program function from the Web server according to the present invention.

At step 98, the server plug-in component 49 saves the path of the CGI program that the Web browser user originally selected, as well as the identity of the selected NT user. The routine then continues at step 100, with the server plug-in then substituting in the name and path of the encapsulation process 57. Processing then continues as described in the flowchart of FIG. 7.

In particular, due to the above-described substitution, the server 45 is controlled to start and execute the encapsulation process 57. This is step 102 in the flowchart of FIG. 7. At step 104, the encapsulation process retrieves the temporary NT user identity and password saved at step 95. At step 106, the encapsulation process then issues an appropriate Windows NT API (e.g., such as "LoginUser( )") passing it the temporary NT userid and password. At step 108, the operating system returns a primary access token to the encapsulation process.

Once the token is returned, the encapsulation process creates a new Windows NT desktop at step 110. This step is done so that the original CGI program requested by the user can execute within its own desktop and thus cannot harm the default server desktop. At step 112, the encapsulation process retrieves the name and path of the CGI program saved at step 98 in FIG. 6. At step 114, the encapsulation program then executes the originally-requested CGI program. Step 114 is carried out, for example, by calling an appropriate Windows NT API, such as CreateProcessAsUser( ), and using the primary access token returned at step 108. At step 116, which occurs during the AddLog step, session manager is notified (using the release_user( )API) by the plug-in that the temporary Windows NT user identity is no longer needed. This completes the processing.

Thus according to the present invention, the inventive method replaces the normal CGI processing done by the Web server and executes the requested CGI program in a new process running within the context of the temporary NT user identity set up with the proper DCE credentials. Such operation is accomplished by substituting a function 55 (namely, dfsweb_send_cgi) for the default send-cgi function provided by the Web server 45. This function saves the name and path of the user-requested CGI program and substitutes the name and path of the encapsulation CGI program 57 (called "webdfs_addkrb.exe"). It also sets up variables to indicate the name and password of the temporary NT user identity, as well as the name and path of the user requested CGI program. These variables are passed to the encapsulation process and allow it to start the user-requested CGI program in a new process within the context of the temporary NT user identity. The dfsweb_send_cgi function then calls the normal server send-cgi function to continue processing the CGI request.

Then, when the Web server creates a new process and executes the encapsulation program, that program first creates a new Windows NT "desktop". This is done to ensure that the CGI program to be executed cannot harm the default (e.g., Netscape server) desktop. Once the new desktop is created, the encapsulation program calls the Windows NT "LoginUser" function, passing the name and password of the temporary NT user identity which was passed from the dfsweb_send_cgi function. This obtains a primary access token.

Then, the encapsulation CGI program obtains the name and path of the user requested CGI (which was saved and passed by the dfsweb_send_cgi function), and executes the user-requested CGI program, for example, by calling the Windows NT "CreateProcessAsUser" function. On the CreateProcessAsUser function call, it specifies the primary access token obtained by the LoginUser call. This causes the requested CGI program to execute within the context of that temporary NT user identity, which was previously set up with the proper DCE credentials.

To effect the inventive method, the HTTP server process configuration file is modified, in effect, to override (but not replace) the send-cgi service method, which would normally be executed to carry out the CGI service request. Thus, according to the preferred embodiment of the invention, the HTTP server process is configured to override the send-cgi service method by adding into the HTTP server configuration file a load directive for the encapsulation process (which is preferably a plug-in). Thus, according to the present invention, with the plug-in (dfsweb_send_cgi) and the CGI process encapsulation code (webdfs_addkrb.exe) installed and configured, any server plug-in called during the AuthTrans, NameTrans, PathCheck or ObjectType steps can execute a CGI process in a desktop protected from the Web server desktop. This operation enables the two processes (namely, the Web server "parent" process and the user-requested CGI "child" process) to execute concurrently yet in an isolated manner. Errors that occur during the CGI processing thus do not impair or otherwise impact operation of the underlying server thread.

Some of the above-described DCE credential functionality may be present in existing DCE-based implementations and thus may not be specifically coded into the plug-in and its associated processes. Thus, for example, when a DCE user performs a dce_login at a command line, known DCE products (e.g. those sourced by Digital Equipment Corporation and Gradient Corporation) add a value to the Windows NT registry which associates a DCE credentials file (created by the dce_login command) with the NT user identity that is currently logged onto the Windows NT system. In the DCE system provided by Digital Equipment Corporation, this function is done by creating a registry key in a particular location which contains the "name" of the NT user logged on, and by creating a value beneath that key, which contains the path to the associated DCE credentials file. In the DCE system provided by Gradient Corporation, the function is similar except the key contains an SID instead of the NT user name. The inventive plug-in process may thus make use of this information in the above-described Windows NT implementation.

One of ordinary skill will appreciate that the present invention is not limited to use with Windows NT operating system. Indeed, the inventive principles are applicable in any client-server environment wherein the Web client and Web server have a native operating system and it is desired to provide secure access to a protected resource in a distributed file service connectable to the Web server.

As used herein, "Web" client should be broadly construed to mean any computer or component thereof directly or indirectly connected or connectable in any known or later-developed manner to a computer network, such as the Internet. The term "Web" server should also be broadly construed to mean a computer, computer platform, an adjunct to a computer or platform, or any component thereof.

One of the preferred implementations of the server plug-in component and the associated processes of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific distributed file system environment, those skilled in the art will recognize that the invention can be practiced, with modification, in other and different hardware and operating system architectures with the spirit and scope of the appended claims. Thus, for example, while the present invention is preferably implemented to allow off-the-shelf browsers to access Web documents stored in DFS, the principles of the invention are equally applicable with other known architectures such as AFS (from which DFS was derived), as well as the Network File System (NFS) developed by Sun Microsystems. Moreover, implementation in Open Group DCE is not a requirement of the present invention either.

Having thus described our invention, what we claim as new and desire to secure by letters patent is set forth in the following claims:

1. A method for protecting concurrently executing computer processes running in a data processing system, comprising the steps of:
   executing a first process;
   detecting that a second process related to the first process should be started;
   starting the second process in an encapsulation process that isolates the second process from the first process so that any problem encountered during operation of the second process does not impact execution of the first process.

2. The method as described in claim 1 wherein the first process is a parent process and the second process is a child process spawned from the parent process.

3. The method as described in claim 2 wherein the parent process is a Web server and the child process is a Common Gateway Interface (CGI) program.

4. The method as described in claim 1 further including the step of:
   initializing a temporary userid for the parent process for access to a secure database;
   passing the temporary userid to the encapsulation process so that the second process may access the secure database operating within the context of the temporary userid.

5. The method as described in claim 4 further including the step of associating the temporary userid with a security credential prior to passing the temporary userid to the encapsulation process.

6. A method for accessing a secure database, comprising the steps of:
   obtaining a temporary userid for a first process for use in accessing the secure database;
   executing the first process;
   starting a second process within an encapsulation process to isolate the second process from the first process so that operation of the second process does not harm the first process;
   passing the temporary userid to the encapsulation process so that the second process may access the secure database.

7. The method as described in claim 6 further including the step of associating a security credential to the temporary userid prior to passing the temporary userid to the encapsulation process.

8. The method as described in claim 7 further including the step of having the second process access the secure database using the temporary userid and the security credential.

9. The method as described in claim 6 wherein the first process is a parent process and the second process is a child process spawned from the parent process.

10. The method as described in claim 9 wherein the parent process is a Web server and the child process is a Common Gateway Interface (CGI) program.

11. The method as described in claim 10 wherein the temporary userid is a native operating system userid selected from a pool of temporary userids.

12. The method as described in claim 6 wherein the secure database is a Distributed File Service.

13. A method of accessing a secure database, comprising the steps of:
   creating a pool of userids for a first operating system;
   selecting a userid from the pool;
   adding the selected userid to a registry of userids for the first operating system;
   creating a credential file for a first process;
   associating the selected userid to the credential file;
   starting the first process;
   starting a second process within an encapsulation process to isolate the second process from the first process so that operation of the second process does not harm the first process; and
   passing the selected userid to the encapsulation process so that the second process may access the secure database.

14. The method as described in claim 13 further including the step of having the second process access the secure database using the selected userid and information in the credential file.

15. The method as described in claim 13 wherein the first process is a Web server and the second process is a Common Gateway Interface (CGI) program.

16. The method as described in claim 6 wherein the secure database is a Distributed File Service.

17. A computer program product in a computer-readable medium for use in accessing a secure shared resource, comprising:

means for spawning a child process from a parent process; and means for isolating the child process from the parent process as the child process accesses the secure shared resource.

18. The computer program product as described in claim 17 wherein the parent process is a Web server thread and the child process is a CGI program.

19. In a computer network in which a client is connectable to a server to enable access to documents within a secure database, the server having a native operating system and including at least one server process that launches a child process, the improvement comprising:

means for associating a temporary native operating system userid with a credential to facilitate access to the secure database;

means for configuring the server to override a service method that normally launches the child process; and means for encapsulating the service method between a first program, executable in the child process, and a second program, executable in the server process;

wherein, upon execution, the first program uses the temporary operating system userid and the credential to access a file in the secure database.

20. In the computer network as described in claim 19 wherein the child process is a CGI program.

21. In the computer network as described in claim 19 wherein the client includes a Web browser.

22. In the computer network as described in claim 19 wherein the native operating system is Windows NT.

23. A computer connectable to a secure database, comprising:

a processor;

a native operating system;

a Web server program for processing client requests; and means for associating a temporary native operating system userid with a credential to facilitate access to the secure database;

means for configuring the Web server program to override a service method that normally launches a child process; and means for encapsulating the service method between a first program, executable in the child process, and a second program, executable in the server process;

wherein, upon execution, the first program uses the temporary operating system userid and the credential to access a file in the secure database.

24. The computer as described in claim 23 wherein the child process is a CGI program.

25. The computer as described in claim 23 wherein the native operating system is Windows NT.

* * * * *